(12) United States Patent
Koshino

(10) Patent No.: US 7,862,050 B2
(45) Date of Patent: Jan. 4, 2011

(54) CENTERING PROCESS IN CHUCKING WORK AND APPARATUS THEREFOR

(75) Inventor: Naoki Koshino, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 967 days.

(21) Appl. No.: 11/716,684

(22) Filed: Mar. 12, 2007

(65) Prior Publication Data

US 2007/0228673 A1   Oct. 4, 2007

(30) Foreign Application Priority Data

Mar. 13, 2006   (JP) .............................. 2006-067563

(51) Int. Cl.
*B23B 31/14* (2006.01)
(52) U.S. Cl. ..................... 279/133; 279/128; 279/137; 269/8; 269/56; 269/57
(58) Field of Classification Search ................. 279/133, 279/128, 137; 82/150, 151, 157; 269/8, 269/56, 57
See application file for complete search history.

(56) References Cited

FOREIGN PATENT DOCUMENTS

| JP | 10-43985 | 2/1998 |
|---|---|---|
| JP | 2002-260293 | 9/2002 |
| JP | 2002-337012 | 11/2002 |
| JP | 2002337012 A * | 11/2002 |
| JP | 2003-157589 | 5/2003 |
| JP | 2003157589 A * | 5/2003 |

* cited by examiner

*Primary Examiner*—David P Bryant
*Assistant Examiner*—Bayan Salone
(74) *Attorney, Agent, or Firm*—Browdy and Neimark, PLLC

(57) ABSTRACT

A process and apparatus for centering accurately and speedy a workpiece on a magnet chuck mounted on a work spindle. A pair of action pads spaced away from one another comes into engagement with the workpiece attracted to the work spindle, thereby performing the centering operation. The action pads are mounted on a support plate that can freely turn on a fulcrum. As the fulcrum makes head towards a rotational center of the magnet chuck, the action pads comes into abutment in a rocking manner against the workpiece that is held at off-center relation in the chuck, thereby compensating the off-center relation to keep a center of the workpiece in alignment with the rotational center of the chuck.

3 Claims, 5 Drawing Sheets

CENTERING PROCESS IN CHUCKING WORK AND APPARATUS THEREFOR

FIELD OF THE INVENTION

The present invention relates generally to a machine tool including a lathe and so on having a work spindle equipped thereon with a magnetic chuck and, more particularly, to a process for centering a workpiece in a chucking phase on a chuck mounted on the machine spindle and an apparatus therefor.

BACKGROUND OF THE INVENTION

There are conventionally known processors that can perform accurate facing operations with no need of centering work on a hollow cylindrical workpiece. One example of the processors of the sort as stated just earlier is disclosed in Japanese Patent Laid-Open No. 2002-337012, which is envisaged turning a workpiece of material heat-treated to be highly hardened. The prior processor is composed of a machine spindle supported for rotation on a headstock fastened on a machine bed, a magnet chuck mounted on a lengthwise end of the machine spindle in a way revolving coaxially with the machine spindle, a loose headstock placed on the same rotational axis with headstock, and a three-jaw chuck-mounted on a lengthwise end of the loose headstock in a way revolving coaxially with the loose headstock. The three-jaw chuck or self-centering chuck is to transfer the workpiece held in the chuck to the magnet chuck with keeping the rotational axis of the work in alignment with the rotational axis of the magnet chuck, thereby performing the centering operation.

The processor constructed as stated earlier, nevertheless, has need of a carriage to carry the loose headstock thereon, and therefore could not get out of becoming bulky in construction. Moreover, the workpiece held in the three-jaw chuck, as deformed easily as shown in FIG. 9, is unfair disadvantageous to the centering operation and therefore poses an issue of causing variations in centering from one work to another.

As shown in, for example, Japanese Patent Laid-Open No. H10-43985, an automatic centering process for machining more massive parts has been developed which helps a circular workpiece make automatic centering with accuracy as well as with a very short time on a machine tool. The level of accuracy in centering to be varied depending on the property of workpiece can be selectively determined using an inspection means. With the prior automatic centering process recited earlier, the centering operation is performed with the combination of radially retractable driver units and an inspection unit to detect off-center deflection. The radially retractable driver units are each arranged at a point of three o'clock and another point of from six o'clock to eight o'clock around a circular surface of a workpiece held in a magnet chuck. At a centering mode, the magnet chuck switches to a weaker level in magnetic force. Simultaneously with this, the workpiece starts revolving while the driver units move center-ward and the inspection unit shifts towards a reference surface for measuring the accuracy of centering. After the accuracy of centering comes into a prescribed range that can be tolerated by the inspection unit, a signal to cease the centering work is issued to retract radially the driver units into their home positions where the magnet chuck switches automatically to a stronger level and the machine is turns into a cutting mode at the same time.

The automatic centering process constructed as stated earlier, however, involves for centering operation activating the driver units set at preselected two points separately from one another while detecting the accuracy of centering by the inspection unit. With the prior automatic centering process, thus, there are practical issues that the machine tool has to be made bulky in construction and also lacks in universality for a variety of workpiece size.

As disclosed in, for example, Japanese Patent Laid-Open No. 2002-260293, there is known a centering process to bring the center of a circular plate into coincident relation with the center of a turntable. With this prior centering process, a turntable onboard a circular plate is moved straight by a linear guide mechanism until the outward circular edge of the circular plate comes into abutment against stoppers, thereby getting the center of the circular plate matching the rotational center of the turntable. With the centering device to carry out the centering process as stated earlier, the stoppers are placed in a relation spaced away from one another with an interval less than the diameter of the turntable, so that the circular plate at the first place comes into engagement at the outward circular edge thereof with any one of the stoppers, followed by coming into abutment against the other stopper to make the off-center correction, thereby performing the accurate centering.

The prior centering device constructed as stated earlier needs to set the stoppers with high accuracy in their locations and also lacks in universality for wide variations in circular plate size.

A centering apparatus for a circular plate with no need of rotating a turntable is known conventionally as disclosed in, for example, Japanese Patent Laid-Open No. 2003-157589. The prior centering apparatus for the circular plate as recited earlier is comprised of a turntable to carry a circular plate thereon, and arms with pads at their opposite distal ends laid in diametric opposition with respect to the turntable in a way pivoted at their centers for rocking motion about their fulcrums. As the arms shift towards the center of the turntable, the pads at the opposite ends of the arms come into contact with the outward circular edge of the turntable to follow the contour of the turntable.

However, the centering apparatus for the circular plate in which the four pads are arranged to embrace the circular plate would have a margin of error because the four pads doing their works on the circular plate could vary from one pad to another pad in working position. Moreover, the machine tool has to be made bulky in construction.

SUMMARY OF THE INVENTION

The present invention, therefore, has as its primary object to solve the major challenges as described just above and to provide a process and an apparatus for centering a workpiece in a machine tool including a lathe and so on, which has a work spindle with a chuck thereon used for processing, turning, facing and inspecting operations applied on a workpiece having a circular part. More particularly, the present invention provides a process and an apparatus for centering a workpiece having a circular part, in which the centering operation to set the workpiece on the chuck by virtue of magnetic or vacuum attraction with the center of the workpiece lying in alignment with the rotational axis of the chuck can be achieved by just installation of a centering tool that is simple in construction. Thus, the process and apparatus for centering a workpiece constructed as stated earlier according to the present invention makes it easier to perform the centering operation in chucking work more accurately and rapidly in diverse working fields including processing, measuring and so on of the workpiece, thereby improving the working efficiency in the processing, turning, facing, measuring operations.

The present invention is concerned with a process for centering a workpiece attracted on a chuck mounted on a work spindle, using a centering tool comprising a support block and a pair of action pads lying on the support block with spaced away from one another in a way coming into engagement with a circular part of the workpiece; wherein the support block of the centering tool is supported to turn on a fulcrum; and wherein as the fulcrum of the support block moves head towards a rotational center of the chuck, the support block makes a rocking motion on the fulcrum in a way the action pads come into abutment from any one side against the workpiece that is held at off-center relation in the chuck, thereby compensating the off-center relation to keep a center of the workpiece in alignment with the rotational center of the chuck.

In an aspect of the present invention, a process for centering a workpiece is disclosed in which the chuck is a magnet chuck equipped on a machine tool to attract a cylindrical workpiece thereon and wherein the action pads are made to rise above the support block to come into either an outside or an inside circular surfaces of the workpiece, performing a centering operation of the workpiece on the chuck.

The present invention is further concerned with an apparatus for centering a workpiece; comprising a pair of action pads adapted to come into engagement with a circular part of a workpiece attracted to a chuck, a support block for the centering tool having the action pads thereon in a fashion the action pads are spaced away from one another, and a moving part to bear the support block for free turning on a fulcrum of the support block; and wherein as the moving part gets the fulcrum of the support block moving head towards a rotational center of the chuck, the action pads alternately come into engagement from any one side against the workpiece that is held at off-center relation in the chuck, thereby compensating the off-center of the workpiece to bring a center of the workpiece in alignment with the rotational center of the chuck.

In an aspect of the present invention, an apparatus for centering a workpiece is disclosed in which the chuck is a magnet chuck equipped on a machine tool to attract a cylindrical workpiece thereon and wherein the action pads are made to rise above the support plate of the support block to come into either an outside or an inside circular surfaces of the workpiece, perfoi ining a centering operation of the workpiece on the chuck. In another aspect of the present invention, the centering tool includes a support plate for the support block, a pair of action pads made in a fashion raised above the support plate, a shank fastened to the moving holder and mounted to the support plate to provide a fulcrum on which the support plate is allowed to turn freely, and a stopper fastened to the shank so as to come into abutment against recessed edges that are in opposition to one another on both sides of the stopper. In a further another aspect of the present invention, the moving part fastened to the shank of the support block is a holder mounted on a turret equipped on a machine tool.

The centering process and apparatus constructed as recited earlier can be well applied to a wide variety of machines. Just mounting the centering tool of simple construction to any moving part of a turret of machine tools is sufficient to perform quickly the centering operation to set the center of the workpiece in alignment with the rotational center of the chuck, such as magnet chuck and vacuum chuck, on which the workpiece having a circular part is attracted for cuts, such as turn and face, and measurements. High-speed centering of the workpiece on the chuck is desirable to complete the cuts including turning of inside and outside circular surfaces, facing flat surfaces on the ends of the cylindrical workpiece with high efficiency.

DETAILED DESCRIPTION OF THE PREFERRED EMBODIMENTS

A preferred embodiment of a process and an apparatus for centering a workpiece according to the present invention will be explained hereinafter in detail with reference to the accompanying drawings. The present invention is preferably adapted to a centering process and apparatus for a workpiece, which is used in a diversity of machines including machine tools, inspection instruments, measuring instruments, semiconductor fabricating equipment, various robots, and so on.

Figure 1:
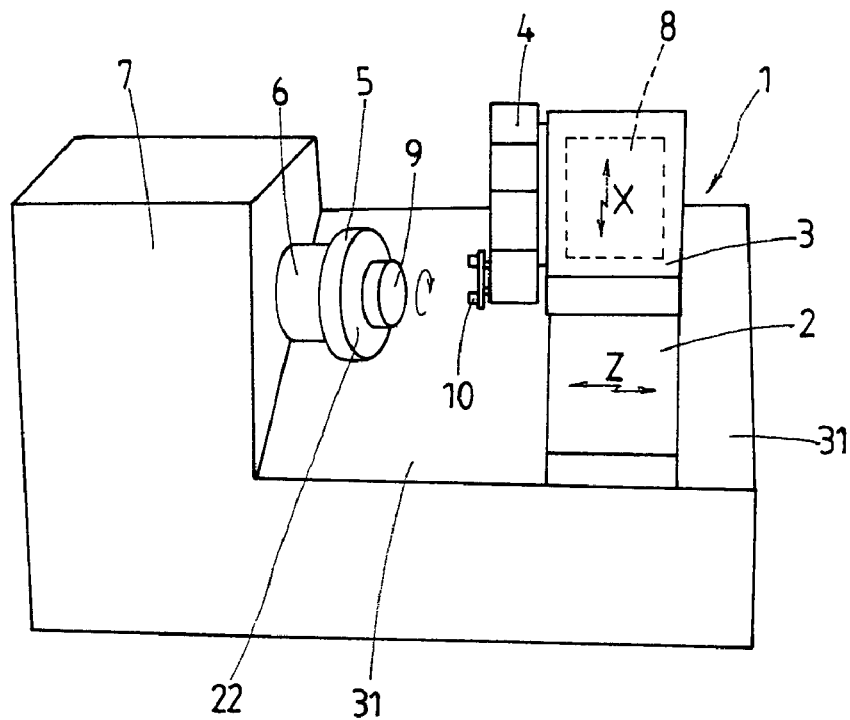
FIG. 1 is a schematic view illustrating a turning machine equipped with a centering apparatus according to the present invention.
Figure 2:
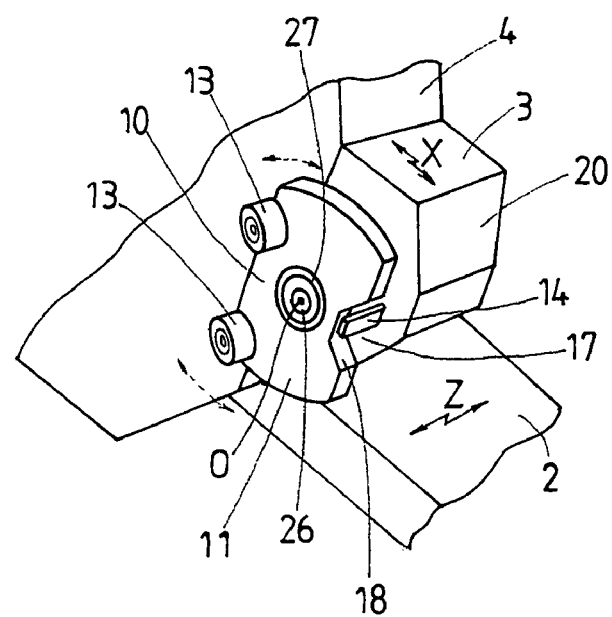
FIG. 2 is a schematic fragmentary view in perspective of a centering tool for the centering apparatus of FIG. 1.
Figure 3:
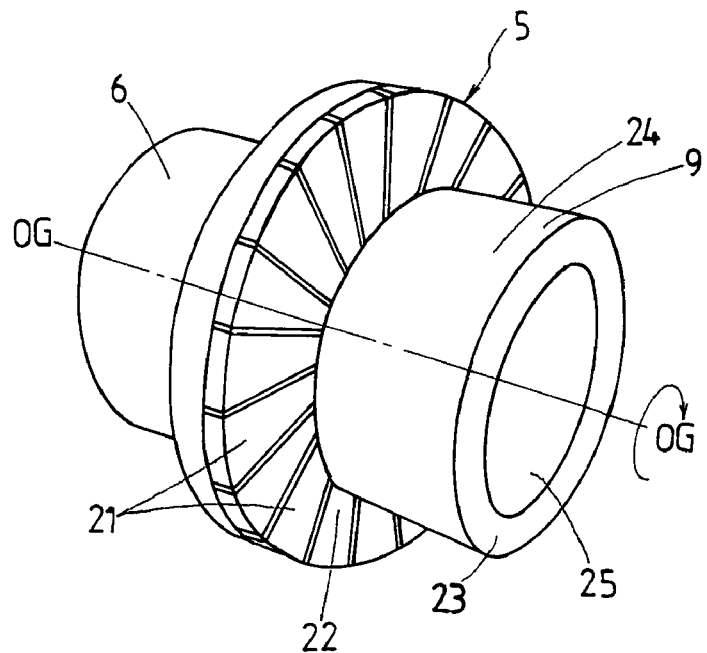
FIG. 3 is a schematic view in perspective showing a workpiece attracted magnetically to a turret after having been centered using the centering apparatus.
Figure 4:
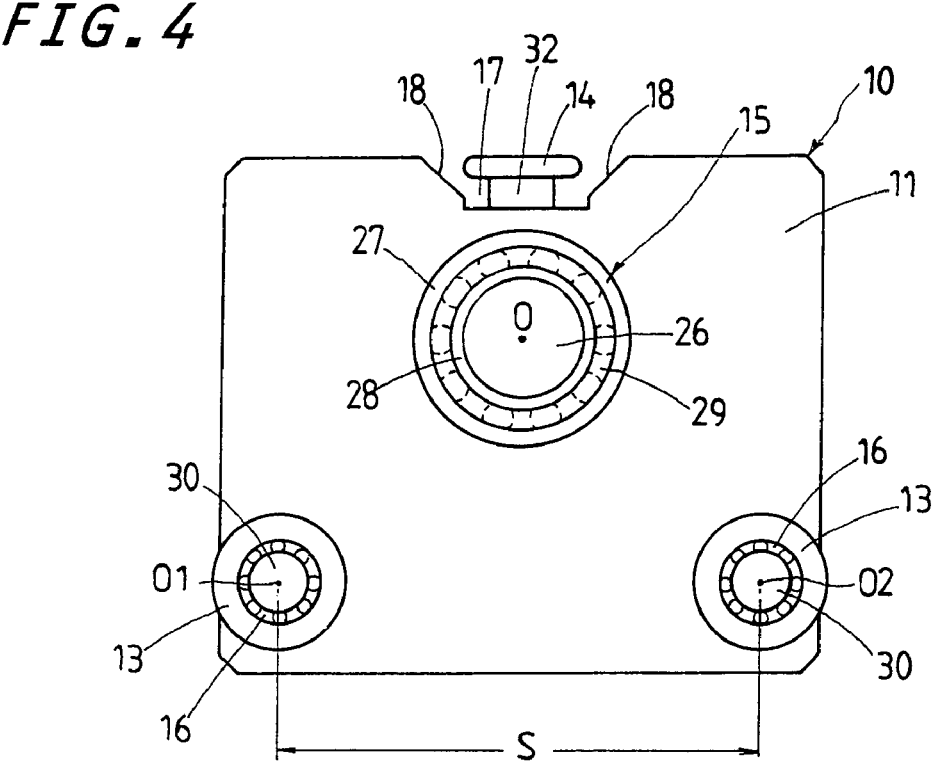
FIG. 4 is a view in front elevation of the centering tool for the centering apparatus of FIG. 1.
Figure 5:
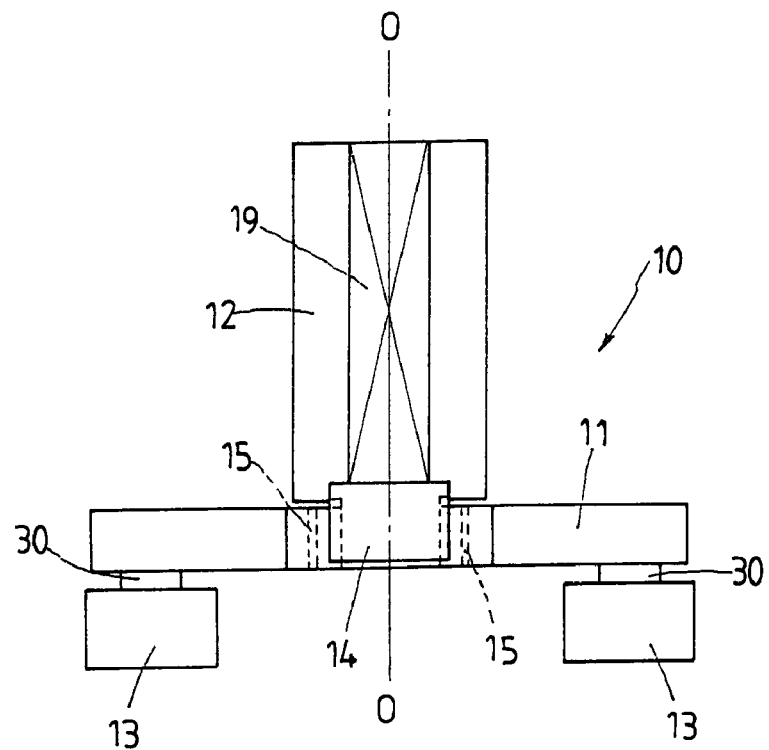
FIG. 5 is a plan view of the centering tool of FIG. 4.
Figure 6:
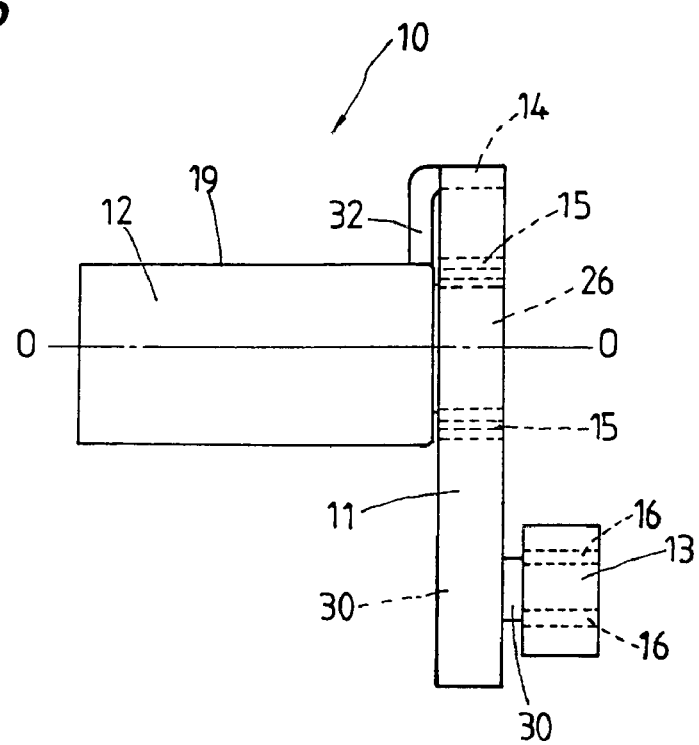
FIG. 6 is a view in side elevation of the centering tool of FIG. 4.

The embodiment of the centering apparatus according to the present invention is shown in FIGS. 1 to 3 in a fashion adapted for a machine tool 1 or lathe of the type equipped thereon with a magnet chuck 5 of circular contour. The magnet chuck 5 is composed of many permanent magnet pieces 21 whose flat front surfaces serve as attractive surfaces 22. The magnet pieces 21 are positioned circularly around a work spindle 6 in a fashion extending radially outward of the work spindle 6 and revolving together with the work spindle 6. The magnet chuck 5 utilizes the permanent-electro magnetic system that allows the control of the magnetic holding force. With the embodiment explained here, a centering tool 10 is clamped on a turret 4, or a rotary indexing tool rest, among a plurality of cutting tools that are positioned circularly in a fashion each extending radially outwards. The turret 4 is mounted on an X-axis slider 3. Moreover, the turret 4 is allowed to move in either of an X-axis or infeed direction and a Z-axis direction or laterally reciprocating direction in FIG. 1 with respect to a sloping machine bed 31. On the slant machine bed 31, a cross slide or a Z-axis slider 2 is mounted for movement in the Z-axis direction while the X-axis slider 3 with the turret 4 thereon is supported on the Z-axis slider 2 for movement in the X-axis direction.

In preparation for centering operation on a workpiece 9 with using the centering tool 10 constructed according to the version illustrated, the magnet chuck 5 is first deactivated or made less in magnetic holding force and then the workpiece 9 is attracted tentatively along any one circular edge 23 thereof with less force to the magnet chuck 5. After the completion of the centering operation for the workpiece 9 with respect to the magnet chuck 5, the activation of the magnet chuck 5 to strengthen the magnetic holding force starts to perform the turning operation to cut the workpiece 9. The hollow cylindrical workpiece 9 recited in the present embodiment is envisaged outer rings, inner rings and retainers in rolling-contact bearings. Cuts, such as turn and face, on the workpiece 9 attracted magnetically to the chuck 5 are performed on a circular external surface 24, a circular internal surface 25 and any one exposed circular end 23, excepting other circular end 23 coming into engagement with the magnet chuck 5. With the embodiment thought of turning a circular internal surface 25 inside the workpiece 9, the centering operation is carried out in a way getting action pads 13 of the centering tool 10 coming into engagement with the circular external surface 24 of the workpiece 9.

Referring mainly to FIGS. 4 to 7, there is shown a preferred version of the centering tool 10 according to the present invention. The centering tool 10, although constructed as shown hereinafter to make it easier to use it, but is not limited to such a version. A support frame constituting the centering tool 10, for example, may be made in diverse configurations other than a support block 11. With the version shown here, the centering tool 10 is comprised of the support block 11, a pair of action pads 13 installed on the support block 11 in a way raised above the support block 11, a journal 26 to bear the support block 11 so as to serve as a fulcrum (O), a shank 12 extending from the journal 26 to fit into a holder 20, and a stopper 14 extending out of the shank 12 into a recess 17 to come into engagement and disengagement from recessed edges 18 on the support block 11. The holder 20 for the centering tool 10 is installed in the turret 4 on the X-axis slider 3 in return for any one of the cutting tools that are positioned circularly at regular intervals. The turret 4 on the lathe provides the tool rest, or tool block, for mounting the cutting tools thereon. The shank 12 is adapted to fit into a matching hole made in the holder 20 in such a relation that fulcrum (O) lying on the rotational axis of the shank 12 makes head for a rotational center (OG) of the magnet chuck 5 in the X-axis direction at the indexed location.

With the centering tool 10 in the version illustrated, the action pads 13 coming into contact with the workpiece 9 to exert the force on the workpiece 9 are placed in opposition to the fulcrum (O) with respect to the workpiece 9. Alternatively, the action pads 13 and the fulcrum (O) may be reversed each other with respect to the workpiece 9. The cylindrical workpiece 9 is magnetically secured at any one circular end 23 thereof to a front surface 22 of the magnet chuck 5.

Moreover, the magnet chuck 5, although may employ any one of electromagnetic, permanent magnet and electro-permanent magnetic systems, but selects the electro-permanent magnetic system in the version illustrated. The electro-permanent magnetic system features increased holding or attraction power with less heat loss compared to only the permanent magnets.

With the centering tool 10 constructed as in the version illustrated, there are installed two action pads 13 in a fashion raised above any one surface of the support block 11 to provide points (PA) of action, where come into contact with the workpiece 9. The action pads 13 are made of cylindrical bodies serving likewise a kind of cam follower, and supported on shafts 30 for rotation through bearings 16. The action pads 13 mounted for rotation on the support block 11 are more universal or versatile for contact-movement with the workpiece 9. The action pads 13 employed in the version illustrated is a tracking roller of stud type, or a cam follower, in which needle rollers are installed for the bearings 16. Thus, the centering tool 10 can be made by only installation of the cam followers to the support block 11. Two cam followers or action pads 13 are spaced apart from one another by a preselected distance (S) and mounted on the support block 11 that is pivoted for rocking movement at the fulcrum (O). Moreover, the shank 12 whose rotational axis lies on the fulcrum (O) is mounted on the support block 11 in a way extending above the side opposite to the action pads 13.

The shank 12 adapted to fit into the holder 20 on the turret 4 is lengthwise cut on the circular surface thereof to make an axial flat surface 19 to make it easier to lock the shank 12 in the holder 20 at a desired angular orientation. A bolt extending through the holder 20 into abutment against the flat surface 19 of the shank 12 helps keep the shank 12 at the desired angular position. The shank 12 is integral at any one axial end thereof with the journal 26, which fits into the support block 11 for rotation through a cross-roller bearing 15 that is comprised of an outer ring 27, an inner ring 28 and rollers 29 interposed between the outer and inner rings 27 and 28.

As the support block 11 is not necessarily allowed to turn over the circle in full, the stopper 14 is provided to limit the tolerated revolving range within a preselected revolving angle. A distal end of a bent arm 32 whose another end is fastened to the shank 12 extends into the recessed area 17 in the support block 11, thereby providing the stopper 14 that defines the tolerated revolving range of the support block 11 when coming into collision against any one of the opposite edges 18 bordering the recess 17 made in the support block 11. Thus, the action pads 13 are allowed to rock around the fulcrum (O) of the support block 11. All the two action pads 13 are needed in their geometric relation is lying on both sides, one to each side, of the line of action on which the fulcrum (O) of the support block 11 gets closer to the rotational center (OG) of the magnet chuck 5, while being separated apart from one another by a preselected distance (S) that allows the action pads 13 to keep the rolling-contact with the workpiece 9 irrespective of how extent the support block rocks. There is no point in positioning the action pads 13 with accuracy. With the version illustrated, the support block 11 and two action pads 13 are made in such a geometric relation that straight lines joining the fulcrum (O) of the support block 11 with each the centers (O1) and (O2) of the action pads 13 form roughly an isosceles triangle. Any configuration may be selected for the support block 11 as long as it allows the support block 11 to rock about the fulcrum (O) and also the action pads 13 to rest on the support block 11. Other constructional demands, such as size and so on, of the centering tool 10 are free to choose depending on the scale of the workpiece 9, the reforming ability of any deviation in location of the workpiece 9 which might be caused by magnetic attraction, and the like. Further, the centering tool 10 of the present invention is versatile for a wide range in size of the workpiece 9.

Figure 7:
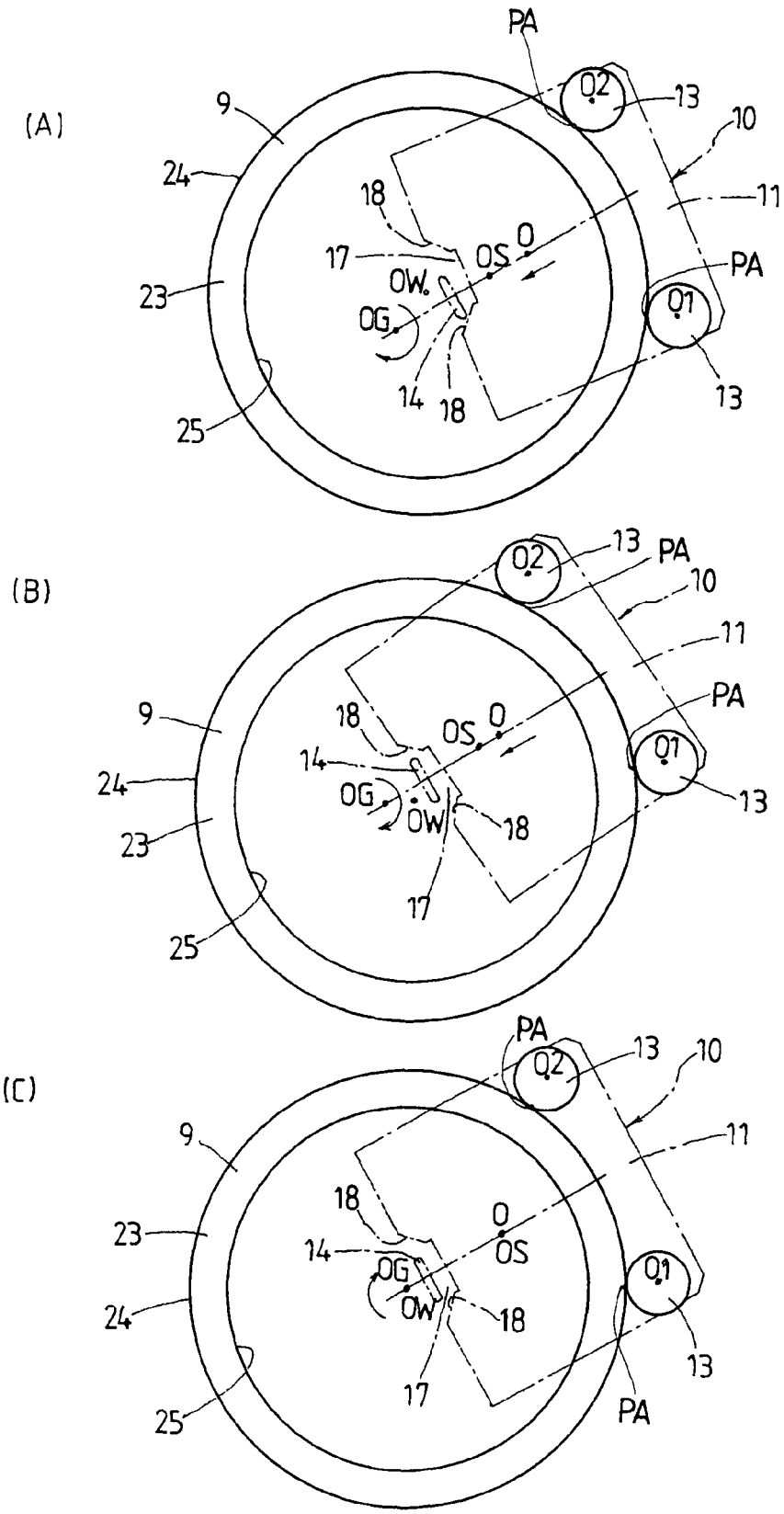
FIGS. 7(A) to 7(C) are illustrations explanatory of how a workpiece is centered by the centering tool of FIG. 1, in which the (A) shows a phase the workpiece is set off-center or lopsided towards any one side, the (B) shows another phase the workpiece is lopsided towards other side, and the (C) is a further another phase the workpiece is free of the lopsided condition.

Next, how the workpiece 9 is subjected to centering operation on the magnet chuck 5 will be described later with reference to FIG. 7. With the process for centering the workpiece according to the present invention, the centering operation for the workpiece 9 is completed while the chuck 5 rotates together with the workpiece 9 magnetically attracted to the chuck 5. It will be certainty that the centering operation is equally applicable regardless of whether the magnet chuck 5 having the workpiece 9 attracted to the chuck 5 is rotating or ceases rotating. The action pads 13 are arranged to come into rolling-contact with the circular outside surface of the workpiece 9 to exert on the workpiece 9. The centering tool 10 of the version illustrated is better adapted to turn a plurality of workpiece 9 in succession. After the workpiece 9 is held in the magnet chuck 5, the centering operation will finish when the teetering action pads 13 come to a stop. Automation of the centering operations can be carried out by installation of any detector, not shown in the turret 4 to sense the rocking behavior of the action pads 13 and/or the support block 11.

With the version illustrated, the following settings are needed in preparation for the centering operation of the workpiece 9 held in the chuck 5.

At an early stage of the centering operation as shown in FIG. 7(C), a position to teach the completion of the centering operation is predicted depending on the size of the first workpiece 9. The position to teach the completion of the centering operation is found by a point (OS) on which the fulcrum (O) of the support block 11 converges when the center (OW) of the workpiece 9 comes into coincidence with the rotational center (OG) of the magnet chuck 5.

Second, as considering the size of the workpiece 9 can vary widely from one to the other, a targeted amount of centering is preset. The real amount of centering is determined short of the convergent point (OS) by any measuring instrument. Then, the support block 11 is moved to get closer to the convergent point (OS) depending on how far the measured amount is away from the targeted amount whereby the centering is completed. With the version illustrated, for example, the targeted amount of centering is set within the range of 0.02 mm.

Third, the measuring instrument is mounted on the turret 4 at any one of the locations reserved for the cutting tools.

Thus, the action pads 13 are once detached from the workpiece 9 short of the convergent point (OS). Instead, the measuring instrument comes into engagement with or gets closer to the workpiece 9 to confirm the degree of off-center of the workpiece 9. When the off-center is still more than the targeted amount of centering, the action pads 13 again come into abutment against the workpiece 9 to resume compensating the off-center to complete the centering operation.

The centering process and the centering apparatus of the present invention can perform automatically a sequence of phases as stated earlier.

In a phase in which the center (OW) of the workpiece 9 lies above (in the figure) the center line (O)-(OG) for movement as shown in FIG. 7(A), the two action pads 13 are allowed to come into contact at their points (PA) of action with the circular outside surface 24 of the workpiece 9 so as to embrace the workpiece 9. When the workpiece 9 is further rotated in eccentric relation with respect to the rotational center (OG), the workpiece 9 varies to be reformed in its position towards the rotational axis as the fulcrum (O) moves towards the rotational center (OG).

In another phase in which the center (OW) of the workpiece 9 lies below (in the figure) the center line (O)-(OG) for movement as shown in FIG. 7(B), the two action pads 13 are allowed to come into contact at their points (PA) of action with the circular outside surface 24 of the workpiece 9 so as to embrace the workpiece 9. When the workpiece 9 is further rotated in eccentric relation with respect to the rotational center (OG), the workpiece 9 varies to be reformed in its position towards the rotational axis as the fulcrum (O) moves towards the rotational center (OG).

In a final phase in which the center (OW) of the workpiece 9 comes into coincidence with the rotational center (OG) after the fulcrum (O) has reached the convergent point (OS) for movement as shown in FIG. 7(C), the two action pads 13 are allowed to come into contact at their points (PA) of action with the circular outside surface 24 of the workpiece 9 so as to embrace the workpiece 9, while the support block 11 comes to stop the rocking motion. This phase teaches the completion of the centering operation. After the completion of the centering operation for the workpiece 9 with respect to the magnet chuck 5, the magnet chuck 5 is activated to strengthen the magnetic holding force exerted on the workpiece 9 to perform the turning operation on the lathe.

The centering process and apparatus working as stated earlier make it possible to machine a plurality of workpiece 9 continuously and automatically throughout from the centering operation to the turning operation in one chucking. With the centering apparatus constructed according to the present invention, the action pads 13 made to teeter are allowed to embrace the workpiece 9 so as continue keeping engagement with the workpiece 9 that rotates in highly eccentric orbits with respect to the magnet chuck 5, thereby serving the smooth centripetal function. On the contrary, with the conventional centering tool kept against teetering, the action pads could not follow successfully every posture of the workpiece. Thus, the workpiece falls off from the magnet chuck and, therefore, such conventional centering tool is apt to fail in smooth centering of the workpiece.

Figure 8:
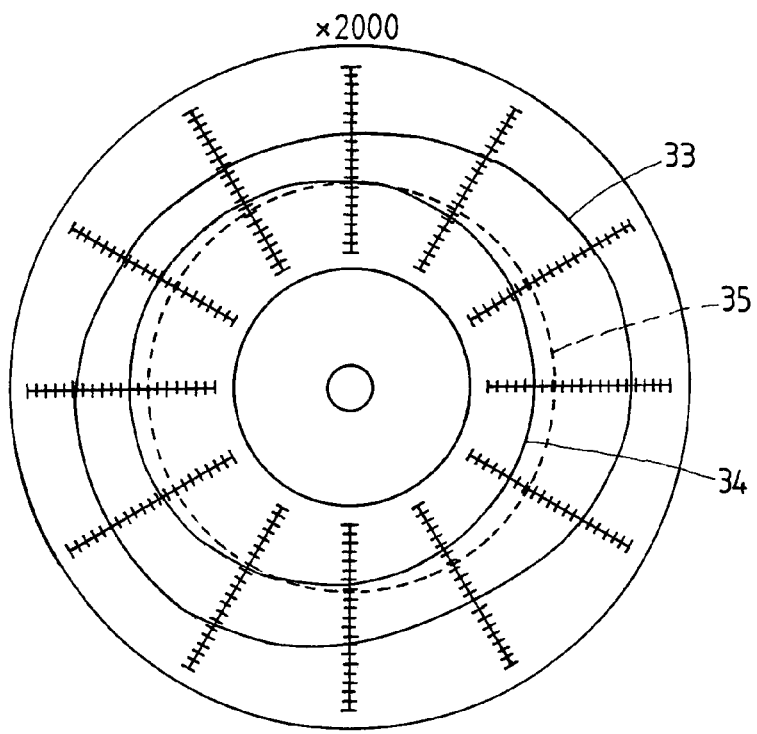
FIG. 8 is a diagram illustrating inspection results of circularity and coaxiality measured in the workpiece after centered by the centering apparatus of FIG. 1.

Referring to FIG. 8, there are shown circularity 33 and coaxiality 34 found really on the workpiece 9 that was turned after centering operation according to the present invention, together with theoretical or ideal coaxiality 35.

The results illustrated were achieved in internal cylindrical turning operations of the workpiece 9 that was a cylindrical material of inside diameter: ϕ110 mm, outside diameter: ϕ126 mm and axial length: 6 mm.

The action pads 13 of the centering apparatus came into contact with the circular outside surface 24 of the cylindrical material to center the cylindrical material. Then, the centered cylindrical material was held in the magnet chuck 5 and turned to cut the circular inside surface 25. The measured result (2000 times in measuring magnification) after turning operation showed the centered material could be finished by turning work to the coaxiality 34 of 0.0042 mm and the circularity 33 of 0.0037 mm.

Figure 9:
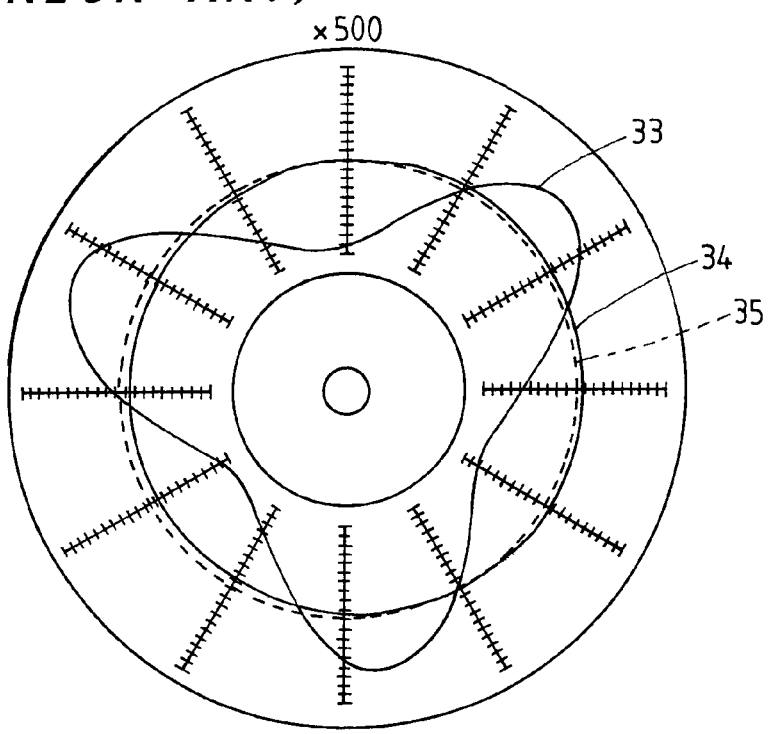
FIG. 9 is a diagram illustrating inspection results of circularity and coaxiality measured in the workpiece after centered by the conventional centering apparatus of FIG. 1.

The result shown in FIG. 9 was found on the workpiece 9 that was cut by internal turning work with held in the conventional three-jaw chuck and, then untethered from the chuck to be inspected after the completion of internal turning. As apparent from the measured result (500 times in measuring magnification), though the coaxiality 34 was achieved to 0.008 mm, the circularity 33 on the inside diameter was found only 0.066 mm and the workpiece 9 finished by turning work remained depressed at three locations where the three-jaw chuck grasped the workpiece 9 in chucking work.

What is claimed is:

1. An apparatus for centering a workpiece, comprising:
a centering tool which has a pair of action pads adapted to come into engagement with a circular part of the workpiece attracted to a chuck,
a support block having the action pads mounted thereon in a fashion that the action pads are spaced away from one another, and
a moving part to bear the support block for free turning on a fulcrum of the support block;

wherein the centering tool includes a support plate for the support block, and the pair of action pads made in a fashion raised above the support plate;

a shank fastened to a moving holder and mounted to the support plate to provide the fulcrum on which the support plate is allowed to turn freely, and a stopper fastened to the shank so as to come into abutment against recessed edges that are in opposition to one another on both sides of the stopper, and wherein as the moving part gets the fulcrum of the support block that moves towards a rotational center of the chuck, the action pads alternately come into engagement from any one side against the workpiece that is held at off-center relation in the chuck, thereby compensating the off-center of the workpiece to bring a center of the workpiece in alignment with the rotational center of the chuck.

2. An apparatus for centering a workpiece, as set forth in claim 1, wherein the chuck is a magnet chuck equipped on a machine tool to attract a cylindrical workpiece thereon and wherein the action pads are made to rise above the support block to come into an outside circular surfaces of the workpiece, performing a centering operation of the workpiece on the chuck.

3. An apparatus for centering a workpiece, as set forth in claim 1, wherein the moving part fastened to the shank extending out of the support block of the centering tool is a holder mounted on a turret equipped on a machine tool.

* * * * *